(12) United States Patent
Chrostowski et al.

(10) Patent No.: US 8,527,123 B2
(45) Date of Patent: Sep. 3, 2013

(54) VEHICLE RESPONSE SYSTEM AND METHOD

(75) Inventors: Thomas Chrostowski, Chesterfield, MI (US); Joseph Youqing Xiang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 12/893,435

(22) Filed: Sep. 29, 2010

(65) Prior Publication Data

US 2012/0078455 A1    Mar. 29, 2012

(51) Int. Cl.
*B60W 20/00*    (2006.01)

(52) U.S. Cl.
USPC ............... 701/22; 318/473; 180/65.265

(58) Field of Classification Search
USPC ............ 701/22; 180/65.265, 65.28; 318/473
See application file for complete search history.

(56) References Cited

U.S. PATENT DOCUMENTS

| | | | |
|---|---|---|---|
| 5,345,154 A * | 9/1994 | King | 318/49 |
| 7,034,482 B2 | 4/2006 | Komiyama et al. | |
| 7,216,943 B2 * | 5/2007 | Nishikawa et al. | 303/152 |
| 7,532,960 B2 | 5/2009 | Kumar | |
| 7,988,594 B2 * | 8/2011 | Heap et al. | 477/3 |
| 2005/0099146 A1 * | 5/2005 | Nishikawa et al. | 318/63 |
| 2007/0034426 A1 * | 2/2007 | Akamatsu et al. | 180/65.2 |
| 2007/0219702 A1 * | 9/2007 | Kishimoto | 701/103 |
| 2007/0284179 A1 * | 12/2007 | Laeuffer | 180/380 |
| 2008/0150573 A1 * | 6/2008 | Fu et al. | 324/772 |
| 2009/0023548 A1 * | 1/2009 | Imamura et al. | 477/3 |
| 2009/0066283 A1 | 3/2009 | Son et al. | |
| 2012/0031079 A1 * | 2/2012 | Spicer et al. | 60/278 |

FOREIGN PATENT DOCUMENTS

EP    1950878 A1    7/2008

OTHER PUBLICATIONS

Zhou, Yuliang Leon, Modeling and Simulation of Hybrid Electric Vehicles, Beijing, 2005, pp. 1-147.
Kheir, Jalil N., et al., A Rule-Based Energy Management Strategy for a Series Hybrid Vehicle, American Control Conference, 1997, vol. 1, Jun. 4-6, 1997, pp. 1.
Farago, Robert, The Truth About Cars, Volt Birth Watch 104: GM Apologizes for Change in Volt's Propulsion. Almost., Sep. 26, 2008, USA Today, pp. 1-23.

\* cited by examiner

*Primary Examiner* — Helal A Algahaim
(74) *Attorney, Agent, or Firm* — David B. Kelley; Brooks Kushman P.C.

(57) ABSTRACT

In a hybrid electric vehicle (HEV), the available energy from a battery may be inadequate to drive a motor to generate additional torque sufficient for driveability upon a request for an increase in wheel torque. The motor may then be operated in a lossy, inefficient mode. When the motor operates in the lossy mode, engine power can be increased such that the sum of the engine power and the maximum available battery power may exceed requested wheel power. The increased engine power may be dissipated as heat in the motor until an increase in wheel torque is requested, whereby the motor may switch from the lossy mode back to a normal, efficient mode. By switching back to the normal mode, the excessive engine power that was being dissipated as heat in the motor may contribute to the output torque of the motor.

20 Claims, 3 Drawing Sheets

VEHICLE RESPONSE SYSTEM AND METHOD

TECHNICAL FIELD

The present application relates to a system and method for improving vehicle response to changes in requested torque.

SUMMARY

According to one or more embodiments of the present application, a control system may determine whether an electric machine can generate additional machine torque sufficient to meet a request for an increase in wheel torque at one or more drive wheels. Upon a determination that the electric machine cannot generate sufficient additional machine torque, the control system may increase an amount of power generated by an engine. Moreover, the control system may decrease the efficiency of the electric machine and cause at least a portion of the engine power to be dissipated as heat in the electric machine. The control system may receive a request for an increase in wheel torque. In response to the request, the efficiency of the electric machine may be increased, thereby transferring the engine power to be dissipated as heat in the electric machine to the drive wheels.

Prior to increasing engine power and decreasing electric machine efficiency, the control system may first determine that the electric machine can dissipate additional engine power as heat in the electric machine. This determination may include determining that a temperature of the electric machine does not exceed a temperature threshold.

DETAILED DESCRIPTION

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
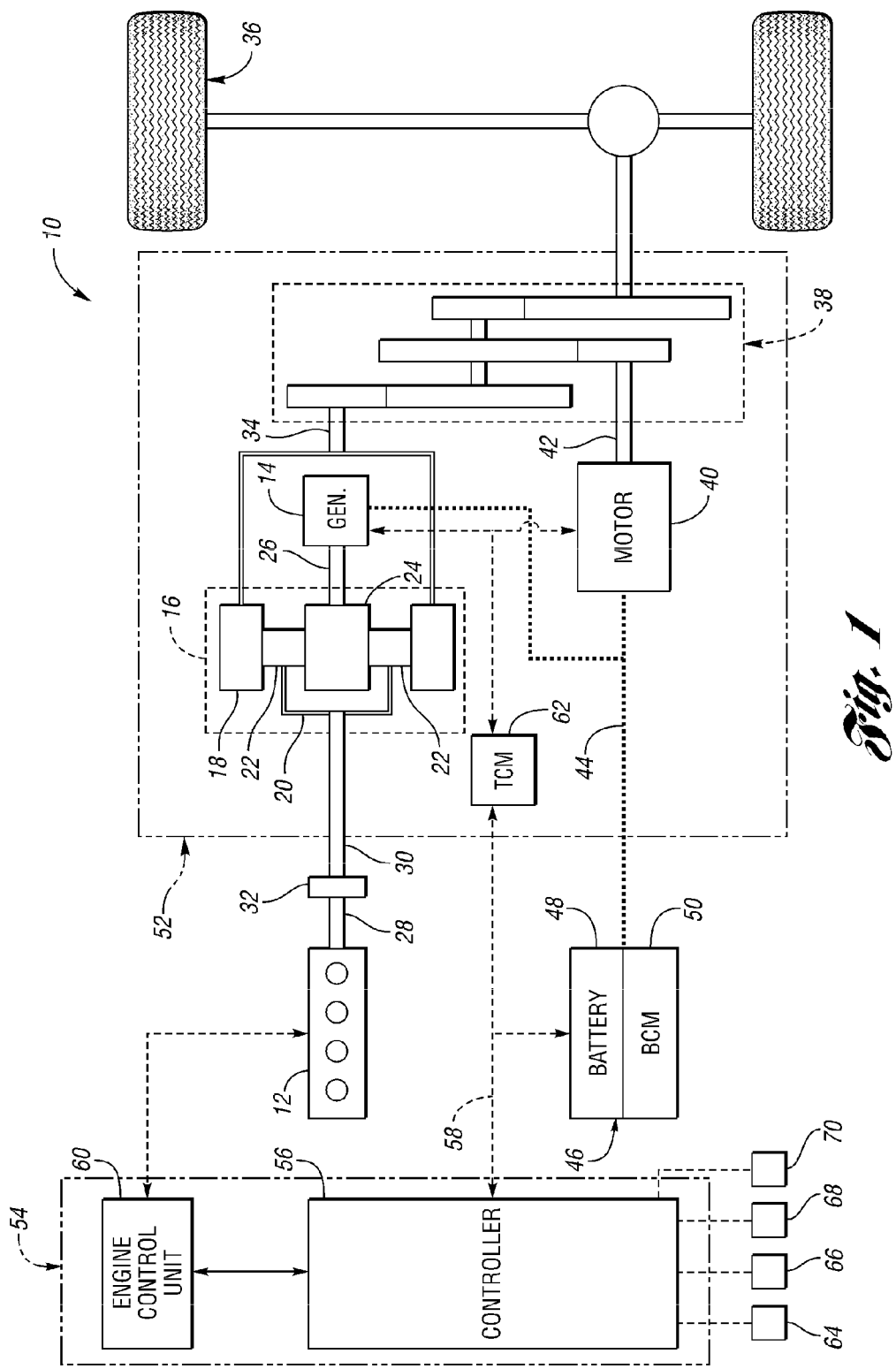
FIG. 1 is a simplified, exemplary schematic diagram of a hybrid electric vehicle (HEV) according to one or more embodiments of the present application.

Referring now to the drawings, FIG. 1 is a simplified, exemplary schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 can output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 may act as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. Although depicted as a powersplit device in FIG. 1, other HEV powertrain configurations may be employed, such as parallel or series HEVs. To control the engine 12 and components of the transmission 52 (e.g., the generator 14 and motor 40), a vehicle control module 54, such as a powertrain control module (PCM), may be provided. The control module 54 may include a vehicle system controller (VSC), shown generally as controller 56. Although it is shown as a single controller, the controller 56 may include controllers that may be used to control multiple vehicle systems. The control module 54 may include both software embedded within the controller 56 and/or separate hardware to control various vehicle systems.

A controller area network (CAN) 58 may allow the controller 56 to communicate with the transmission 52 and the BCM 50. Just as the battery 48 includes a BCM 50, other devices controlled by the controller 56 may have their own controllers. For example, an engine control unit (ECU) 60 may communicate with the controller 56 and may perform control functions on the engine 12. In addition, the transmission 52 may include a transmission control module (TCM) 62, configured to coordinate control of specific components within the transmission 52, such as the generator 14 and/or the motor 40. Some or all of these various controllers can make up a control system in accordance with the present application. Although illustrated and described in the context of the vehicle 10, which is a HEV, it is understood that embodiments of the present application may be implemented on other types of vehicles, such as a plug-in hybrid electric vehicles (PHEV) or those powered by an electric motor alone.

Also shown in FIG. 1 are simplified schematic representations of a braking system 64, an accelerator pedal 66, and a gear shifter 68. The braking system 64 may include such things as a brake pedal, position sensors, pressure sensors, or some combination thereof (not shown) as well as a mechanical connection to the vehicle wheels, such as the wheels 36, to effect friction braking. The braking system 64 may also include a regenerative braking system, wherein braking energy is captured and stored as electrical energy in the battery 48. Similarly, the accelerator pedal 66 may include one or more sensors, which, like the sensors in the braking system 64, may communicate information to the controller 56, such as accelerator pedal position. The gear shifter 68 may also communicate with the controller 56. For instance, the gear shifter may include one or more sensors for communicating the gear shifter position to the controller 56. The vehicle 10 may also include a speed sensor 70 for communicating vehicle speed to the controller 56.

The engine 12 may be the sole power source in an HEV, such as vehicle 10. The battery 48 can, however, operate as an energy storage device. For instance, the battery 48 may store power from the engine 12 that has been converted into electricity by the generator 14. Further, the vehicle's kinetic energy may be transformed into electrical energy by the motor 40 during braking and stored in the battery 48. The vehicle 10 may have two sources of motive force or power, the engine 12 and the battery 48. The engine 12 may provide mechanical energy to a driveline via reaction torque provided by the generator 14. The battery 48 may provide electrical energy to the driveline through the motor 40.

The combination of energy provided to the driveline from both the engine 12 and the motor 40 may determine the amount of wheel torque ($T_w$) applied to the drive wheels 36. For instance, $T_w=T_e+T_m$, where $T_e$ is engine torque and $T_m$ is motor torque. While energy produced by the engine 12 and motor 40 may be described in terms of power, one of ordinary skill in the art understands that power is a function of torque and rotational speed about an axis, such as engine speed or motor speed.

The controller 56 may receive one or more inputs from a driver, such as accelerator pedal position, brake pedal position, gear shifter position and speed control inputs, or the like. Further, the controller 56 may also receive feedback signals from one or more subsystem controllers, such as the BCM 50, ECU 60, TCM 62, or the like. The driver inputs and feedback signals may be used by the controller 56 to determine the combination of engine power and motor power that may deliver improved fuel economy, emissions, performance and driveability of the vehicle 10 while maintaining state of charge (SOC) of battery 48 and hardware integrity. In doing so, the controller 56 may output control signals corresponding to engine torque, engine speed, wheel torque, or the like. These control signals output from the controller 56 may control functions and/or operating modes of the vehicle 10, such as electric-only vehicle (EV) mode, hybrid mode, engine start and stop, regenerative braking, engine speed-load operating efficiency, battery protection, or the like. As an example, an engine torque command may be sent from the controller 56 to the ECU 60 to effectuate operation of the engine 12. As another example, an engine speed command and a wheel torque command may be sent from the controller 56 to the TCM 62 to effectuate operation of the generator 14 and motor 40.

As previously described, wheel torque ($T_w$) may correspond to the amount of torque supplied to the drive wheels 36 as requested by a driver via the accelerator pedal, brake pedal and/or gear shifter. As previously mentioned, wheel torque provided to the drive wheels 36 may be produced by either the engine 12 or the motor 40 powered by the battery 48, or a combination thereof. However, fuel economy may be improved by limiting the operation of the engine 12 and, thus, the consumption of fuel. To this end, the controller 56 may attempt to maximize EV mode operation, while maintaining battery SOC, and still provide sufficient vehicle performance to meet the power demands of the driver. Accordingly, improved energy efficiency and/or fuel economy may be realized by maximizing the amount of motor torque ($T_m$) transferred from motor 40 to the drive wheels 36 to meet the driver demanded wheel torque ($T_w$).

Moreover, torque from the motor 40 to the wheels 36 may be obtained faster than torque from the engine 12. Stated differently, motor torque ($T_m$) can be generated and transferred to the drive wheels 36 more quickly than engine torque ($T_e$) can be generated and transferred to the drive wheels 36. Therefore, in addition to better fuel economy, improved driveability or vehicle responsiveness to changes in wheel torque demands may be achieved by using the motor 40 to produce the requested wheel torque. At times, however, the energy available from the battery 48 to power the motor 40 may not be adequate for the motor 40 to generate sufficient motor torque to meet potential wheel torque demands requested by a driver. When this occurs, the engine 12 may be started to supplement the maximum available motor torque with engine torque to meet the driver demanded wheel torque. This may result in decreased vehicle driveability, for instance during acceleration, as the transfer of torque from the engine 12 to the drive wheels 36 in response to a driver's request may be relatively slow.

In such power limited operating conditions, conventional vehicles can raise engine speed and torque allowing a torque converter to absorb the additional energy until it is needed. An HEV, such as vehicle 10, may not include a torque converter. Accordingly, the engine power typically cannot exceed the power going to the drive wheels 36 minus the maximum allowable battery power that may be used to drive the motor 40 when the motor 40 is being operated at maximum efficiency. In particular, engine power may not be increased such that the sum of the engine power and the available battery power exceeds the requested wheel power. Limits may be placed on the battery 48, for instance, in order to maintain the battery SOC within a pre-determined range to protect the battery from under and over voltage conditions or to prevent over current conditions. As a result, the battery power available to drive the motor 40 in order to produce torque for the drive wheels 36 may be limited.

In order to improve driveability when battery limits are reached, power from the engine 12 may be reserved in the generator 14 and/or motor 40. In the exemplary embodiment depicted in FIG. 1, the generator 14 and the motor 40 may be two synchronous alternating current (AC) electric machines. Accordingly, each electric machine may operate at different efficiencies depending on how they are driven, as will be described in greater detail below. Electric machine efficiency may span the range from fully efficient to fully inefficient. In a fully efficient electric machine, the maximum possible torque may be produced for a given amount of energy supplied to the machine. In contrast, all of the energy supplied to a fully inefficient electric machine may be dissipated as heat.

As previously stated, power from the engine 12 may be reserved in the generator 14 and/or motor 40 in order to improve driveability when the battery limits are reached. To this end, the motor 40 may be operated inefficiently so that engine power can be increased to exceed the wheel power minus the available battery power required to drive the motor 40 at the requested torque. Therefore, by operating the motor 40 inefficiently, engine power may be increased such that the sum of the engine power and the battery power available to drive the motor 40 exceeds the requested wheel power.

The additional engine power may be used to offset losses in the motor 40 as a result of operating inefficiently. For instance, the additional engine power may be mechanically appliedti the drive wheels 36 to offset a reduction in output torque of the motor 40. The reduction in output torque of the motor 40 may be the result of decreasing motor efficiency without increasing the energy supplied to the motor 40 from the battery 48 due to battery limits having been met. Additionally or alternatively, the additional engine power may be converted into electrical energy by the generator 14 and output to the high voltage bus 44. As a result, the energy input to the motor 40 may be increased without drawing additional energy from the battery 48. Due to the inefficient operation of the motor 40, the additional energy supplied to the motor 40 from the engine 12 as result of increasing engine power may be dissipated as heat in the motor 40. Thus, the wheel torque may remain relatively constant in a limited battery condition despite the reduction in motor efficiency. For the sake of simplicity, efficient operation of the motor 40 may be referred to as "normal mode", whereas inefficient operation of the motor 40 may be referred to as "lossy mode" even though the degree of inefficiency may vary when the motor 40 is in the lossy mode.

The additional losses that can be obtained by operating the motor 40 in a lossy mode may allow for the engine 12 to operate at power levels higher than without the lossy mode. Consequently, the battery SOC may remain within set limits while wheel power demands are met. With the engine 12 contributing more system power than requested by a driver and the excessive power in the system being dissipated as heat in the motor 40, the vehicle 10 can quickly react to a driver's acceleration request by changing the efficiency of the motor 40 from inefficient to efficient, i.e., lossy mode to normal mode. The increase in motor efficiency may result in an immediate increase in output torque of the motor 40, which may be transferred relatively quickly to the drive wheels 36. Accordingly, increased acceleration may be promptly realized under both full and reduced battery limits without waiting on the engine 12.

Figure 2:
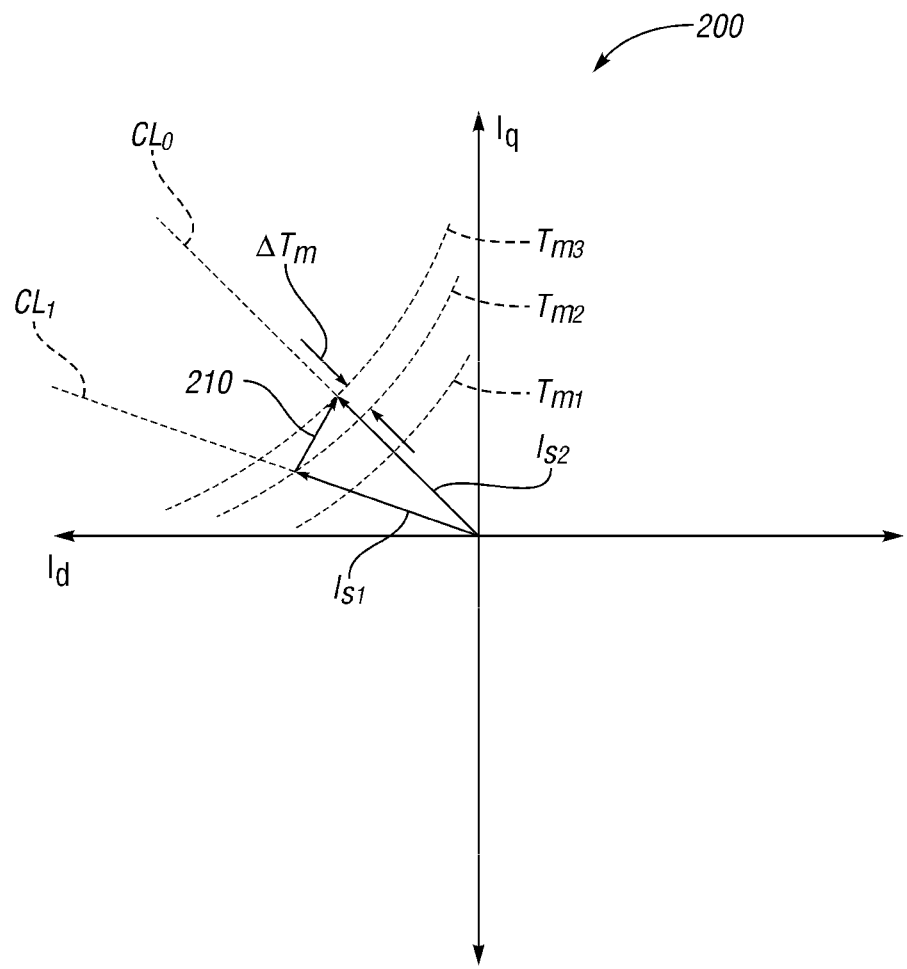
FIG. 2 depicts an exemplary torque characteristic map for an electric machine according to one or more embodiments of the present application.

With reference to FIG. 2, an exemplary torque characteristic map 200 for the motor 40 is shown. As seen therein, the torque characteristic map 200 is a geometric interpretation of a mathematical transformation often used to simplify the analysis of three-phase circuits, such as three-phase synchronous electric machines like motor 40. As is known to one of ordinary skill in the art, the three AC quantities (A, B, C) in a three-phase synchronous motor may be reduced to two direct current (DC) quantities (D, Q). Accordingly, the torque characteristic map 200 may include a direct, or d, axis and a quadrature, or q, axis corresponding to the two imaginary DC quantities. Simplified calculations can then be carried out on these imaginary DC quantities before performing the inverse transform to recover the actual three-phase AC results. By changing the phase or magnitude of these two imaginary DC quantities, for example, the d-axis current ($I_d$) and the q-axis current ($I_q$), the motor 40 can go from operating in the normal, efficient mode to the lossy mode. Thus, the torque characteristics of motor 40 may be analyzed using the torque characteristic map 200 in FIG. 2.

The controller 56 and/or TCM 62 may include the processing capabilities to transform the three AC quantities of motor 40 into the two imaginary DC quantities. Based on a motor torque command value and a motor efficiency command value, the d-axis current ($I_d$) and q-axis current ($I_q$) required to drive the motor 40 at the designated torque and efficiency may be determined. An inverse transformation to obtain the three AC quantities from the two imaginary DC quantities may then be performed. According to one or more embodiments of the present application, the controller 56 and/or TCM 62 may utilize one or more look-up tables to determine the values of $I_d$ and $I_q$ for generating the requisite motor torque in both a lossy mode and the normal mode based upon current vehicle operating conditions.

As shown in FIG. 2, lines $T_{m1}$, $T_{m2}$ and $T_{m3}$, where $T_{m3} > T_{m2} > T_{m1}$, each represent a different value of the motor output torque. Line $CL_O$ may correspond to an optimum efficiency characteristic line. When the motor 40 is operating in the efficient mode, the motor current ($I_s$) may fall along line $CL_O$ where $I_s$ has smallest magnitude for the same torque magnitude. On the other hand, Line $CL_1$ may correspond to a lossy mode characteristic line. When the motor 40 is operating in the lossy mode, the motor current ($I_s$) may fall along line $CL_1$. Thus, in the lossy mode, the magnitude of the motor current ($I_s$) may be greater than the current magnitude for the normal mode. The controller 56 and/or TCM 62 may select other $I_d$ and $I_q$ values, for a given torque ($T_m$), depending on the amount of power to be dissipated in the motor 40 when operating in the lossy mode. For instance, temperature constraints may be applied to the motor 40 to prevent it from overheating, which could lead to degradation in motor performance. Accordingly, the amount of additional engine power that can be dissipated as heat in the motor 40 may be limited by the current motor temperature. Thus, the degree of inefficiency of the motor 40 when operating in the lossy mode may be varied accordingly by changing the magnitude or phase of $I_d$ and $I_q$.

As previously described, to optimize driveability and fuel economy of vehicle 10, the required wheel torque ($T_w$) may be transferred primarily from the motor 40. Thus, the wheel torque may be approximately equal to the motor torque, e.g., $T_w = T_m$. Under normal operation, the motor 40 may be operated in the efficient mode. If additional wheel torque is requested by the driver (e.g., upon acceleration), it may be generated by the motor 40. However, if the limits of battery 48 are reached, then the motor 40 may not be able to supply the additional torque necessary to the drive wheels 36 to meet the drivers request. In such an instance, the additional torque may be supplied by the engine 12.

As also previously discussed, contributing wheel torque from the engine 12 on demand can be relatively slow. Moreover, when operating the motor 40 at maximum efficiency, engine power may not exceed the power going to the wheels minus the maximum available battery power. Thus, according to one or more embodiments of the present invention, when battery limits are met, the efficiency of motor 40 may be reduced to the lossy mode so that additional power from the engine can be reserved in the motor 40. In this regard, the vehicle 10 can quickly react to a request for an increase in wheel torque by changing the efficiency of motor 40 from the lossy mode back to the normal, efficient mode.

In the example shown in FIG. 2, $I_{s1}$ may correspond to an initial motor current required to produce motor torque $T_{m2}$ when the motor 40 is operating in the lossy mode. As such, when the limits of the battery 48 have been met, the values of $I_d$ and $I_q$ may be selected in order for $I_{s1}$ to fall along $CL_1$ representing inefficient operation of the motor 40. By switching to a lossy mode when the limits of the battery 48 have been met, the engine power can be increased resulting in a corresponding increase in system power beyond that currently required by the drive wheels 36. The additional power generated by the engine 12 may supplement the battery power used to drive the motor 40. Moreover, at least a portion of the engine power may be dissipated as heat in the motor 40 to maintain a relatively constant motor output torque. When additional wheel torque is requested by the driver, the vehicle 10 can quickly react to the request by switching from lossy mode to normal mode and using the additional power from the engine 12 previously reserved in the motor 40 as heat to meet the new torque demands. To this end, the engine power may now contribute to the motor output torque when the efficiency of the motor 40 is increased.

Line 210 corresponds to the transition from lossy mode back to normal mode. Again, the shift in operating modes of the motor 40 may occur by changing the magnitude or phase of $I_d$ and $I_q$. New values for $I_d$ and $I_q$ may be selected in order to realize an increase in motor torque from $T_{m2}$ to $T_{m3}$ to meet the wheel torque requested by the driver. Accordingly, $I_{s2}$ may correspond to the new motor current. $\Delta T_m$ may represent the boost in additional torque ($\Delta T_m = T_{m3} - T_{m2}$) produced by the motor 40 when switching from the lossy mode to the normal mode while the engine 12 is being operated at levels higher than what is typically required to meet the requested wheel power during normal mode.

Figure 3:
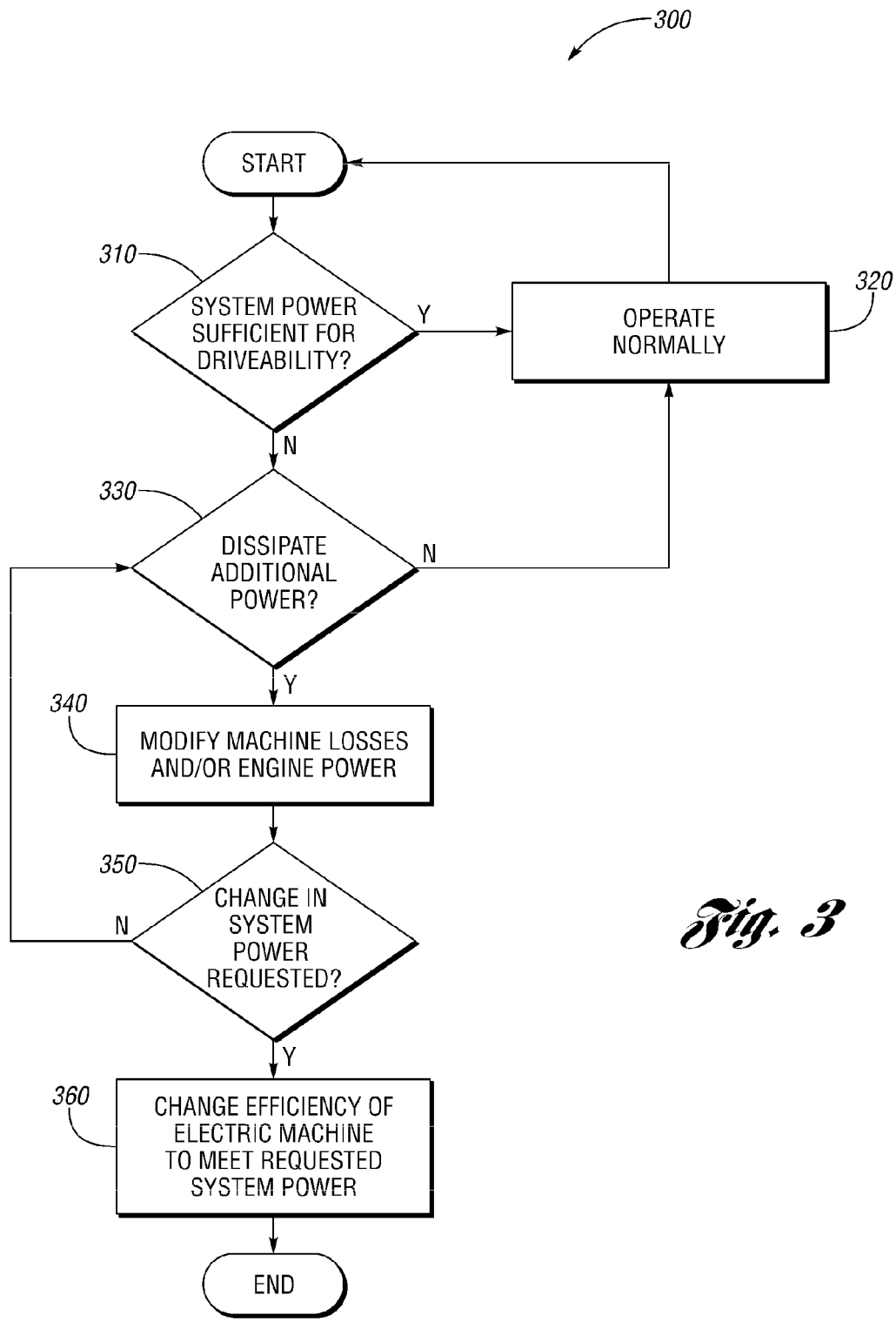
FIG. 3 is a simplified, exemplary flowchart depicting a method according to one or more embodiments of the present application.

Referring now to FIG. 3, a simplified, exemplary flowchart 300 depicting a method according to one or more embodiments of the present application is shown. At step 310, the control system may determine whether system power is sufficient for driveability. In particular, the control system may determine whether the motor 40, operating in the normal mode, can meet potential driver requests for increased wheel torque without exceeding the predetermined limits and/or capabilities of the battery 48. If the limits of the battery 48 have been reached, then the battery 48 may be unable to supply additional electrical energy to the motor 40 in order to produce the additional torque for transfer to the wheels 36 to meet driver demand. To this end, if battery power is sufficient to maintain driveability when a change in wheel torque is requested by the driver, then the method may proceed to step 320. At step 320, the vehicle 10 may continue to operate normally. In this instance, normal vehicle operation may correspond to the motor 40 being operated in the normal, efficient mode.

If, on the other hand, it is determined that the battery limits have been met such that the battery 48 cannot supply the necessary additional energy to the motor 40 when called upon to meet an increase in wheel torque requested by the driver, then the method may proceed to step 330. At step 330, the control system may determine whether the motor 40 can dissipate additional heat. Additional power from the engine can be converted into electrical energy and dissipated as heat in the motor 40. However, the performance of the motor 40 may be affected if it becomes too hot. Thus, the amount of additional power from the engine 12 that can be dissipated as heat in the motor 40 may be limited to prevent the motor 40 from overheating. Correspondingly, at step 330, the control system may determine whether the maximum additional power the motor 40 can dissipate without overheating is greater than zero. If no additional power can be dissipated in the motor 40, then the method may proceed to step 320 where normal operation continues. If, on the other hand, it is determined that the motor 40 can dissipate additional energy as heat without exceeding a temperature threshold, then the method may proceed to step 340.

At step 340, operation of the motor 40 may be switched from normal mode to lossy mode. As previously described, when operating the motor 40 in the lossy mode, additional engine power can be reserved in the motor 40. Accordingly, the control system may modify the values of $I_d$ and $I_q$ in order to operate the motor 40 in an inefficient manner. Further, the control system may increase engine speed and/or engine torque to set additional losses in the motor 40 as heat. In this regard, power from the engine may be increased prior to a request for an increase in wheel torque. The increased engine power may be converted into electrical energy by the generator 14 and supplied to the high voltage bus 44 to supplement the energy supplied to the motor 40 from the battery 48. The additional energy input to the motor 40 may be offset by heat losses in the motor due to operating in the lossy mode. Thus, the motor output torque may remain relatively constant until a driver requests additional wheel torque. By setting additional losses in the motor 40, both driveability and efficiency may be optimized when a request for an increase in wheel torque is received.

At step 350, the control system may determine whether a change in requested wheel torque is received from the driver, e.g., via the acceleration pedal input. If no torque change request is received, the method may return to step 330 where the control system continues to monitor whether the motor 40 can generate more losses without exceeding a temperature threshold. On the other hand, if it is determined that the driver has requested additional wheel torque, then the efficiency of the motor 40 may be increased to meet the driver's request. In particular, at step 360, operation of the motor 40 may be changed from the lossy mode back to the normal, efficient mode. The additional engine power being dissipated in the motor 40 as heat may be transferred to the drive wheels 36 when the efficiency of the motor is increased. Thus, driver torque demands can be met quickly despite the limitations in available battery power.

While exemplary embodiments are described above, it is not intended that these embodiments describe all possible embodiments of the application. Rather, the words used in the specification are words of description rather than limitation, and it is understood that various changes may be made without departing from the spirit and scope of the application. Additionally, the features of various implementing embodiments may be combined to form further embodiments of the application.

What is claimed:

1. A method comprising:
   receiving input indicating that an electric machine cannot generate additional machine torque sufficient to meet a request for an increase in wheel torque at one or more drive wheels;
   increasing an amount of power generated by an engine and decreasing an efficiency of the electric machine in response to the input;
   dissipating at least a portion of the engine power as heat in the electric machine;
   receiving a request for an increase in wheel torque; and
   increasing the efficiency of the electric machine and transferring the engine power to be dissipated as heat in the electric machine to the drive wheels in response to the request.

2. The method of claim 1, wherein receiving input indicating that the electric machine cannot generate additional machine torque includes receiving input indicating that an energy storage device cannot supply additional energy necessary to drive the electric machine to generate the additional machine torque.

3. The method of claim 2, wherein the energy storage device is a battery and receiving input indicating that the energy storage device cannot supply additional energy includes receiving input indicating a state of charge of the battery.

4. The method of claim 1, wherein increasing the amount of power generated by the engine includes transmitting an engine control signal corresponding to an increase in engine torque.

5. The method of claim 1, wherein the efficiency of the electric machine is decreased without changing the current amount of machine torque generated by the electric machine.

6. The method of claim 1, wherein the step of decreasing the efficiency of the electric machine includes:
   receiving a first direct-axis current value and a first quadrature-axis current value associated with the electric machine that reduces the efficiency of the electric machine while maintaining the current machine torque; and
   transmitting a first machine control signal corresponding to the first direct-axis current value and the first quadrature-axis current value.

7. The method of claim 6, wherein the step of increasing the efficiency of the electric machine includes:
   receiving a second direct-axis current value and a second quadrature-axis current value associated with the electric machine that increases the efficiency of the electric machine; and
   transmitting a second machine control signal corresponding to the second direct-axis current value and the second quadrature-axis current value.

8. The method of claim 1, wherein the step of receiving a request for an increase in wheel torque includes receiving input from an accelerator pedal corresponding to a request for an increase in vehicle acceleration.

9. The method of claim 1, wherein the step of receiving a request for an increase in wheel torque includes receiving input from a gear shifter corresponding to a shift in gears.

10. The method of claim 1, further comprising:
    prior to increasing engine power and decreasing electric machine efficiency, receiving input indicating that the electric machine can dissipate additional engine power as heat in the electric machine.

11. The method of claim 10, wherein receiving input indicating that the electric machine can dissipate additional engine power as heat in the electric machine includes receiving input indicating that a temperature of the electric machine does not exceed a temperature threshold.

12. A vehicle comprising:
    an engine;
    a motor mechanically coupled to the engine; and
    a control system configured to:
       increase engine power generated by the engine;
       decrease motor efficiency and dissipate the increased engine power as heat in the motor;
       receive a request for an increase in wheel torque; and
       increase the motor efficiency upon receipt of the request.

13. The vehicle of claim 12, wherein the increased engine power to be dissipated as heat in the motor is transferred to one or more drive wheels as torque from the motor when the motor efficiency is increased.

14. The vehicle of claim 12, wherein increasing the engine power generated by the engine includes transmitting an engine control signal corresponding to an increase in engine torque.

15. The vehicle of claim 12, wherein the motor efficiency is decreased without changing motor torque.

16. The vehicle of claim 12, wherein receiving a request for an increase in wheel torque includes receiving input from an accelerator pedal corresponding to a request for an increase in vehicle acceleration.

17. A method comprising:
    increasing engine power such that the sum of the engine power and battery power available to drive a motor exceeds requested wheel power;
    decreasing efficiency of the motor and dissipating at least a portion of the increased engine power as heat in the motor; and
    increasing the efficiency of the motor upon receipt of a request for additional wheel power.

18. The method of claim 17, further comprising:
    upon increasing the efficiency of the motor, transferring the engine power to be dissipated as heat in the motor to one or more drive wheels in response to the request.

19. The method of claim 17, wherein the efficiency of the motor is decreased without changing an amount of torque generated by the motor.

20. The method of claim 17, wherein decreasing the efficiency of the motor includes switching operation of the motor from an efficient mode to a lossy mode and increasing the efficiency of the motor includes switching operation of the motor from the lossy mode back to the efficient mode.

* * * * *